United States Patent
Lee

(10) Patent No.: US 7,203,016 B2
(45) Date of Patent: Apr. 10, 2007

(54) METHOD OF REPRODUCING DATA AND CONTROL DEVICE USING CONTROLLABLE DUMMY READ GATE

(75) Inventor: Jae-sung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 71 days.

(21) Appl. No.: 10/651,044

(22) Filed: Aug. 29, 2003

(65) Prior Publication Data

US 2004/0075936 A1 Apr. 22, 2004

(30) Foreign Application Priority Data

Aug. 31, 2002 (KR) ................ 2002-52292

(51) Int. Cl.
*G11B 5/09* (2006.01)
*G11B 5/035* (2006.01)

(52) U.S. Cl. ..................... 360/51; 360/65

(58) Field of Classification Search ........... 360/31, 360/51, 78.04
See application file for complete search history.

(56) References Cited

U.S. PATENT DOCUMENTS

| | | | |
|---|---|---|---|
| 5,278,815 A | 1/1994 | Mashimo et al. | 369/48 |
| 5,386,405 A | 1/1995 | Fujiwara et al. | 369/59 |
| 5,604,646 A | 2/1997 | Yamawaki | 360/53 |
| 6,229,660 B1* | 5/2001 | Chung | 360/51 |
| 6,285,520 B1* | 9/2001 | Makiura et al. | 360/65 |
| 6,483,789 B1* | 11/2002 | Kubota et al. | 369/53.16 |
| 6,754,019 B2* | 6/2004 | Tokizono et al. | 360/53 |

FOREIGN PATENT DOCUMENTS

JP 2000-195172 7/2000

* cited by examiner

*Primary Examiner*—Wayne Young
*Assistant Examiner*—Daniell L. Negrón
(74) *Attorney, Agent, or Firm*—Staas & Halsey LLP

(57) ABSTRACT

A method of reproducing data and a control device using a controllable dummy read gate. In the method of reproducing data, at least one of a pulse width, a pulse generating location and a number of pulses is controlled so that a dummy read gate is generated. Then, a read gate for reproducing a target sector is generated, and data is reproduced using the read gate. According to the method, the pulse width of the dummy read gate is generated, a location of the defect sector is avoided and error estimation is decreased. Further, in a case where it is determined that the defect sector or signal distortion exists, the read error is prevented by adjusting the pulse generating location of the dummy read gate.

17 Claims, 7 Drawing Sheets

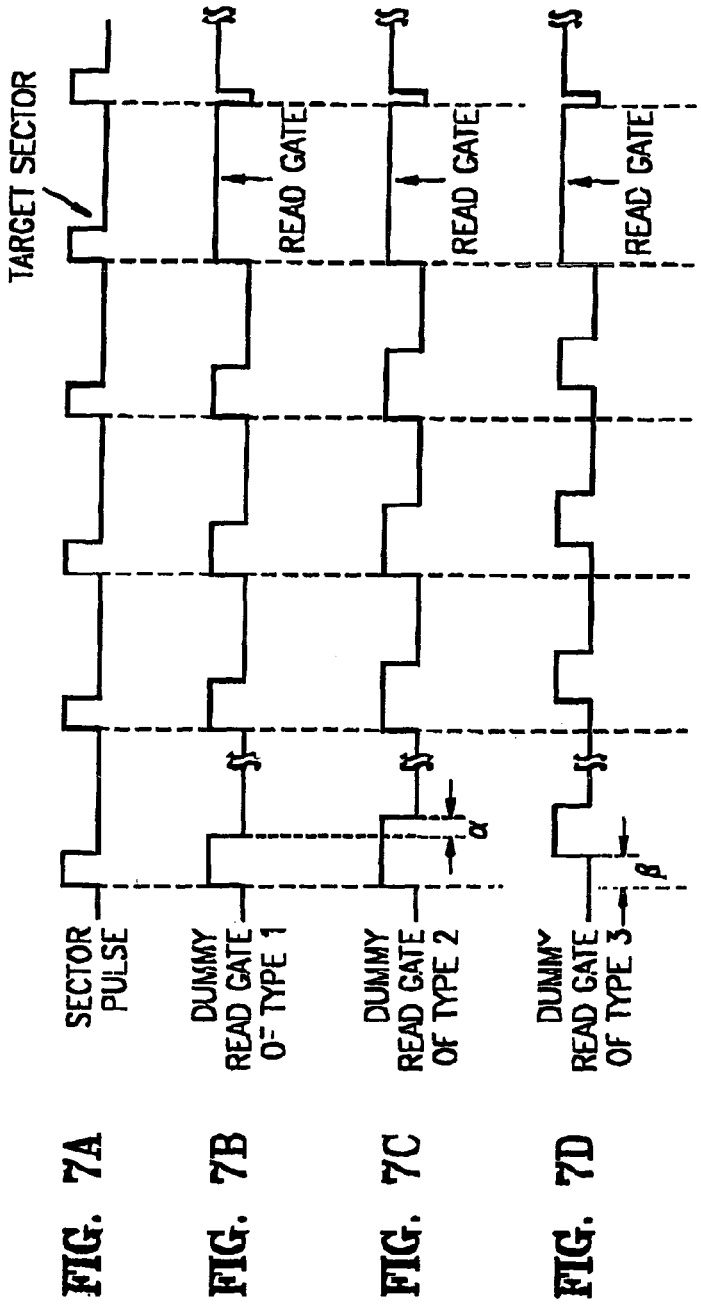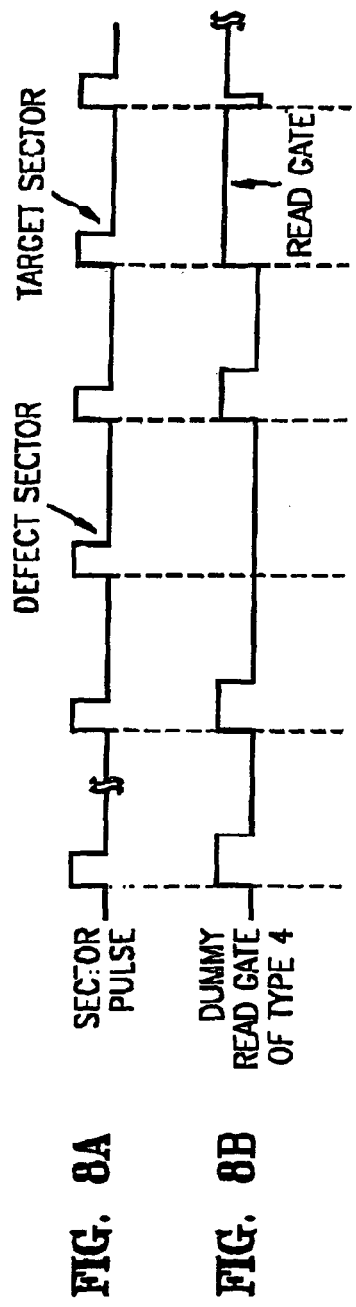

METHOD OF REPRODUCING DATA AND CONTROL DEVICE USING CONTROLLABLE DUMMY READ GATE

CROSS-REFERENCE TO RELATED APPLICATIONS

This application claims the priority of Korean Patent Application No. 2002-52292, filed Aug. 31, 2002, in the Korean Intellectual property Office, the disclosure of which is incorporated herein in its entirety by reference.

BACKGROUND OF THE INVENTION

1. Field of the Invention

The present invention relates to a magnetic disk unit, and more particularly, to a method of reproducing data and a control device using a dummy read gate for controlling a pulse width, a pulse generating location or the number of pulses, before reading data from a disk.

2. Description of the Related Art

A hard disk drive, one type of computer auxiliary memories, is used for reproducing data from a disk by a magnetic head, or writing new data on the disk by the magnetic head. In order to obtain a hard-disk drive having high-capacity, high-density and of small-size, recording parameters such as BPI (bits per inch), and TPI (tracks per inch) decrease, thereby a method and device for accurately and rapidly controlling a head location are required.

Generally, since a target sector is detected using a reproduction instruction and a read gate is generated in the target sector, a mode set of channel IC for the corresponding target sector is interlocked into the read gate. Thus, a preset mode is difficult to obtain, and AGC (amp gain control), asymmetry control or FIR (finite input response) filtering, etc., do not give sufficient time for a preliminary tuning of a signal of the read gate or post tuning of the signal of the read gate. A dummy read technique is developed for solving the above-described problems. In this technique, a dummy read signal is generated in a data sector prior to the target sector, before the read head reaches the target sector, thus tuning a channel of the read head.

However, while the dummy read signal according to the related art is generated in the data sector prior to the target sector, the pulse width, the pulse generating location or the number of pulses cannot be controlled. This is due to the short distance between a sector, which a head reaches for the first time, and the target sector, or due to a defect sector, existing in a sector performing the dummy read, thus setting an inaccurate channel parameter by erroneous information. Thus, a read error is generated in the target sector and the location for performing the dummy read is erroneous, and the dummy read function cannot be efficiently performed.

SUMMARY OF THE INVENTION

According to one aspect of the present invention there is provided a method of reproducing data and a control device using a dummy read gate for controlling a pulse width, a pulse generating location or the number of pulses.

According to another aspect of the present invention there is provided a computer readable recording medium that stores a program for carrying out the above method of reproducing data.

According to another aspect of the present invention, a method of reproducing data using a controllable dummy read gate comprises generating a dummy read gate by controlling at least one of a pulse width, a pulse generating location and the number of pulses; generating a read gate for reproducing a target sector; and reproducing data using the read gate.

According to another aspect of the present invention, a method of reproducing data using a controllable dummy read gate comprises calculating a distance between a sector on a disk on which a head is located and the target sector to increase a pulse width of a dummy read gate, if the distance is smaller than a predetermined value; removing the pulse of the dummy read gate corresponding to a location of the defect sector of the disk; generating a dummy read gate, in which the pulse width is increased and removing the pulse corresponding to the defect sector; generating a read gate for reproducing the target sector; and reproducing data using the read gate.

According to another aspect of the invention, a hard disk drive controlling device using a controllable dummy read gate comprises a controller which generates a dummy read gate by adjusting at least one of a pulse width, a pulse generating location and the number of pulses, and generates a read gate for reproducing a target sector; a head which reproduces data from a disk or records data on a disk; and a preamp which amplifies a signal of data reproduced from the head.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A through 7D are diagrams of dummy read gates of various types for adjusting a pulse width and a pulse generating location of a dummy read gate according to the present invention; and FIG. 8A is a diagram showing a sector pulse having a defect sector and a target sector. FIG. 8B is a diagram illustrating an adjustment of the number of pulses of a dummy read gate by removing a pulse corresponding to a defect sector, if the defect sector exists, according to the present invention.

DETAILED DESCRIPTION OF THE PREFERRED EMBODIMENTS

Figure 1:
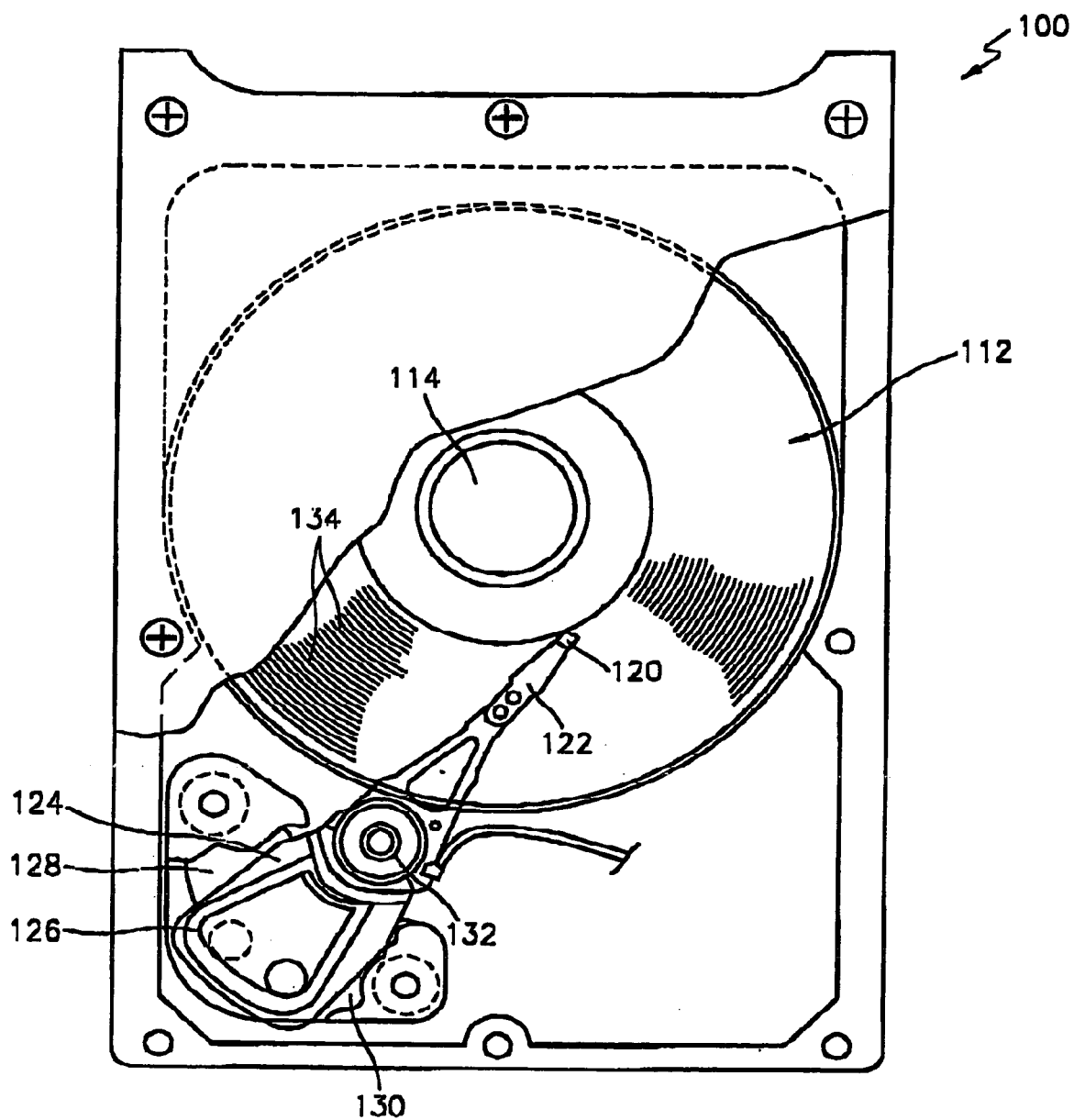
FIG. 1 is a diagram of a hard disk drive according to a first aspect of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a configuration of a hard disk drive 100 according to an aspect of the present invention. The hard disk drive 100 includes at least one disk 112 rotated by a spindle motor 114. The hard disk drive 100 further includes a conversion unit (not shown) adjacent to a surface of the disk 112.

The conversion unit can read or write information from or on to the rotating disk 112 by detecting a magnetic field formed on the surface of the disk 112, or magnetizing the surface of the disk 112. Although the conversion unit is presented as a single unit in the present invention, the conversion unit includes a write converter for magnetizing the disk 112 and a read converter for detecting a magnetic field of the disk 112, each of which is separately installed.

The conversion unit may be incorporated into a head 120. The head 120 is configured to generate an air bearing between the conversion unit and the surface of the disk 112. The head 120 is coupled to a head stack assembly (HSA) 122. The HSA 122 is attached to an actuator arm 124 having a voice coil 126. The voice coil 126 is located adjacent to a magnetic assembly 128 specifying a voice coil motor (VCM) 130. Current supplied to the voice coil 126 generates a torque for rotating the actuator arm 124 about a bearing assembly 132. The conversion unit moves across the surface of the disk 112 by rotation of the actuator arm 124.

Information is stored in a circular track of the disk 112. The disk 112 generally includes a data zone for writing user data, a parking zone in which a head is located when not using a drive, and a maintenance cylinder. As shown in FIG. 1, tracks 134 each include a plurality of sectors. Each sector includes a data sector including a data field and identification (ID) field, and a servo sector including servo information. Inter sector gap (ISG) areas exist between the data sectors. Digital data is written in the data field, and the identification (ID) field includes information for distinguishing the sector and the cylinder (track). The servo information written in the servo sector includes a preamble, a servo address mark (SAM), a gray code, burst information and PAD information. When reading the servo information, the preamble provides clock synchronization and simultaneously provides a gap in a front of the servo sector, so that the preamble indicates that a sector is a servo sector. The preamble is referred to as servo synchronization. The SAM provides synchronization for reading the gray code, which follows the servo, by informing start of servo and provides a reference point for generating a timing pulse related to servo control. The gray code provides the number of tracks to the respective tracks. The burst provides a position error signal (PES) required for seeking a track and following the track. The PAD provides a transition margin from the servo sector to the data sector. The conversion unit moves across the surface of the disk 112 for reading or writing information from or on the other track.

Figure 2:
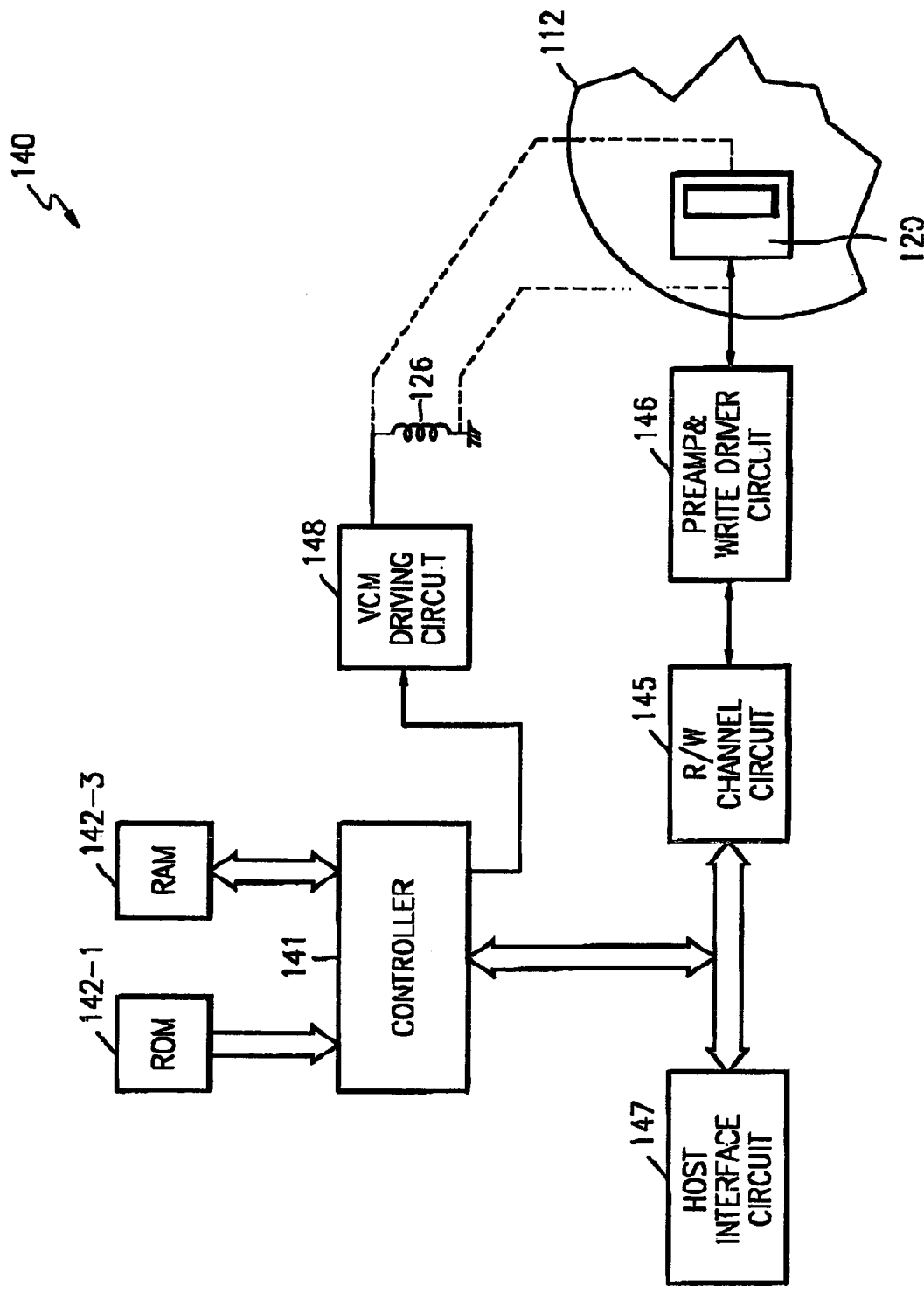
FIG. 2 is a block diagram of a control device controlling a hard disk drive according to the present invention.

FIG. 2 is a block diagram of a control device 140 controlling the hard disk drive 100 according to the present invention.

The control device 140 includes a read/write (R/W) channel circuit 145, and a controller 141 coupled to the head 120 by a preamp & write driver circuit 146.

The controller 141 may be a digital signal processor (DSP), a micro-processor, a micro-controller, and so on. The controller 141 supplies the R/W channel circuit 145 with a control signal for reproducing data from the disk 112 or writing data onto the disk 112. The controller 141 generates a dummy read gate signal for following a parameter of the R/W channel circuit 145 to a target value, and generates a read gate signal for reproducing data by a read head. Particularly, the controller 141 calculates a distance D between a sector on the disk 112, on which the head 120 is located and a target sector, generates a dummy read gate having an increased pulse width when the distance D exceeds a value of 10, and generates a read gate signal for reproducing data by a read head. The distance D refers to a difference between a location of a sector, when the head 120 has completed seeking a ready state for data reproduction on the track 134, and a location of a target sector. A critical value of the distance D, that is, the value of 10, for example, is a value experimentally obtained according to a pulse width. Further, the controller 141 determines whether a defect sector exists according to information from a defect map stored in a buffer 142-3. Where the defect sector exists, the controller 141 generates a dummy read gate signal by removing the pulse of the dummy read gate corresponding to a location of the defect sector. In the event where a read error is generated when reproducing data by the head 120, the controller 141 generates a dummy read gate signal controlling a pulse generating location.

Information is typically sent from the R/W channel circuit 145 to a host interface circuit 147. The host interface circuit 147 includes a control circuit, which allows a disk drive to interface with a system such as a personal computer.

The RW channel circuit 145 converts an analog signal, which is read by the head 120 in the reproduction mode and amplified by the preamp 146, into a digital signal capable of being read by a host computer (not shown), and the digital signal is outputted to the host interface circuit 147. Further, the R/W channel circuit 145 receives user data from the host computer though the host interface circuit 147, the R/W channel circuit 145 converts the user data into a write current capable of writing in the disk 112, and the write current is outputted to the write driver circuit 146.

The controller 141 is coupled to a VCM driving circuit 148 supplying a driving current to the voice coil 126. The controller 141 supplies a control signal to the driving circuit 148 for controlling an excitation of the VCM 130 and a movement of the conversion unit.

The controller 141 is coupled to a nonvolatile memory such as a ROM (read only memory) or a flash memory 142-1, and a RAM (random access memory) 142-3. The memories 142-1 and 142-3 include instructions used by the controller 141 for entering software routines and data.

Amongst the software routines stored in memories 142-1 and 142-3, there are a seek routine which moves the conversion unit from one track to the other track, and a following routine seeking a target sector in a track. The seek routine includes a control routine to accurately move the conversion unit to a desirable track.

The memories 142-1 and 142-3, a computer program for generating the dummy read gate, and respective set values of the pulse width, the pulse generating location and the number of pulses of the dummy read gate are stored.

Figure 3:
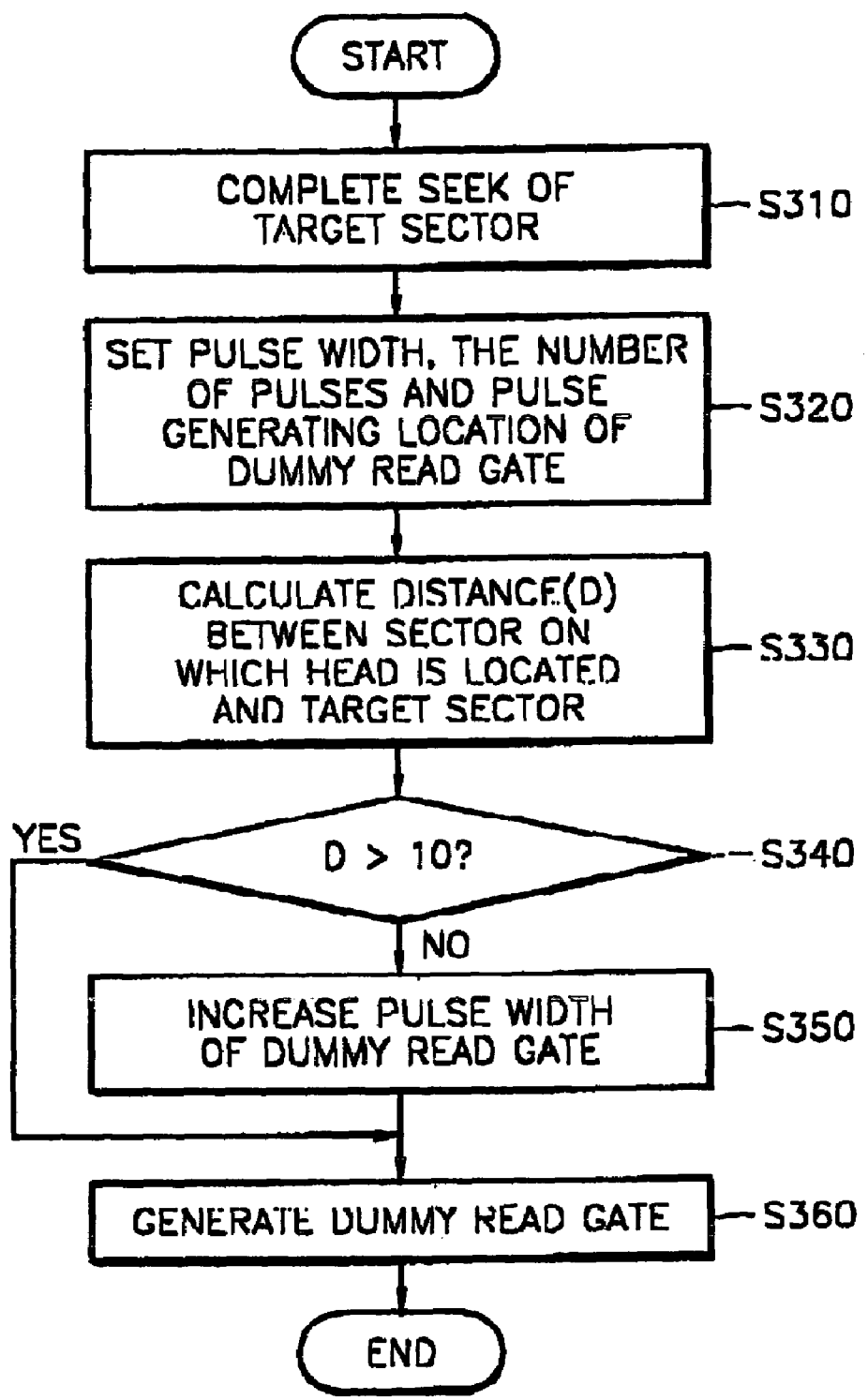
FIG. 3 is a flowchart of a method of reproducing data using a controllable dummy read gate for adjusting the pulse width according to a difference between a location of a sector, where a read head seeks a ready state on a track so that data reproduction is completed, and a location of a target sector, when controlling a pulse width, a pulse generating location or the number of pulses of a dummy read gate, according to the present invention.

FIG. 3 is a flowchart of a method of reproducing data using a controllable dummy read gate for adjusting the pulse width according to a difference between a location of a sector, and a location of a target sector when a read head completes seeking on a track a ready state for data reproduction, by controlling a pulse width, a pulse generating location or the number of pulses of a dummy read gate, according to the present invention.

In operation S310, a target sector is sought according to a read instruction from a host computer so that the head 120 is located on a track on which the target sector exists. In operation S320, a pulse width, a pulse generating location and the number of pulses of a dummy read gate are set, and the respective set values are stored in the memories 142-1 and 142-3.

In operation S330, after the seek of the target sector is completed, a distance D between a sector on the disk 112, on which the head 120 is located, and a target sector is calculated by the controller 141. In operation S340, it is determined whether the distance D exceeds 10 sectors. The distance D refers to a difference between a location of a sector, when the head 120 has completed seeking a ready state for data reproduction, and a location of a target sector. If the distance D is 10 or less, the pulse width is increased in operation S350 by a predetermined set value a by instruction of the controller 141, and an adjusted dummy read gate is generated, in operation S360. If the distance D exceeds 10, a dummy read gate having the pulse width set in operation S320 is generated in operation S360. The pulse width of the dummy read gate ranges from 1 byte to a sector size generally it is sufficient that the pulse width range is from 10 to 20 bytes.

Figure 4:
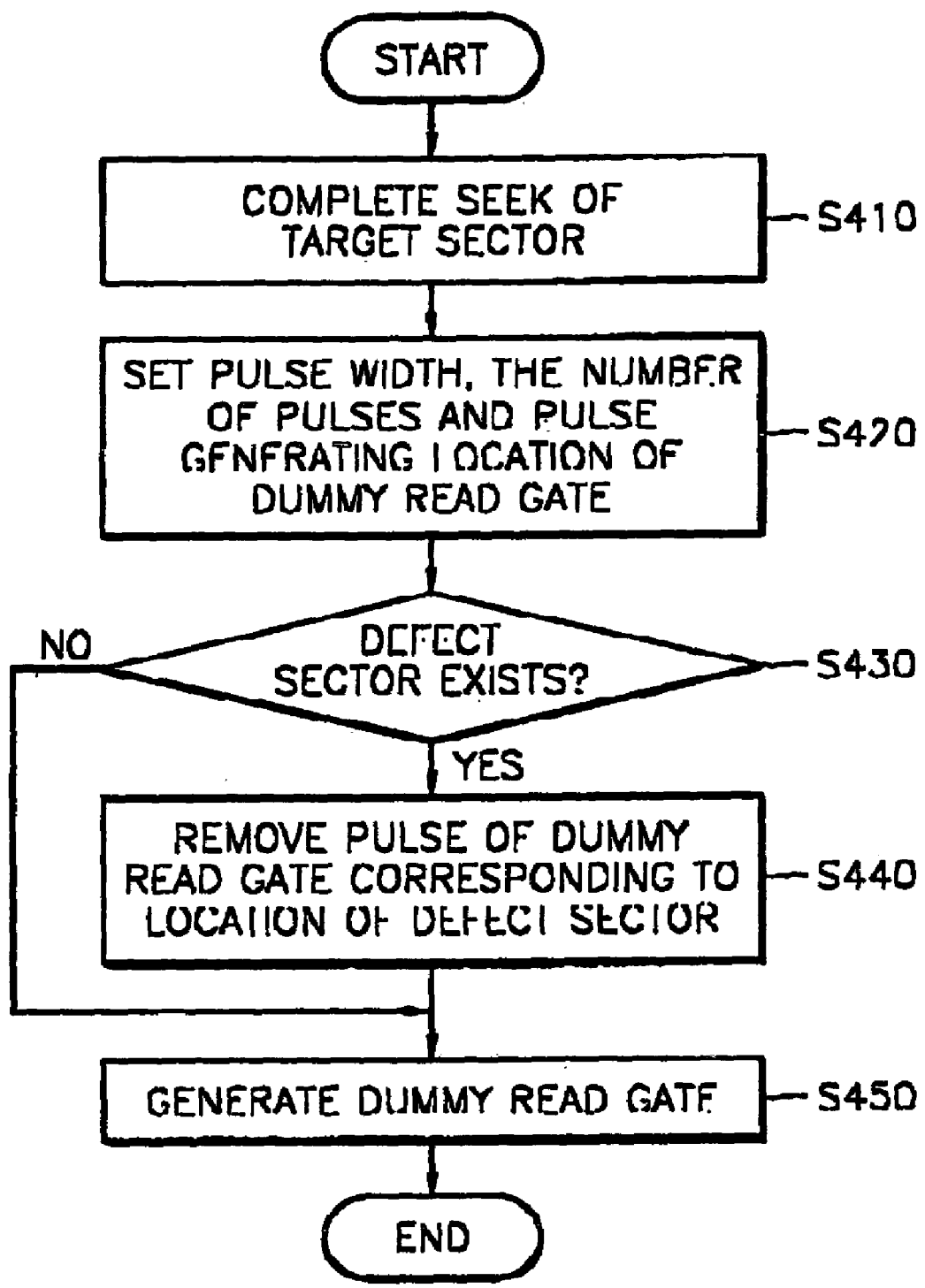
FIG. 4 is a flowchart of a method of reproducing data using a dummy read gate for controlling the number of pulses by removing a pulse of a dummy read gate corresponding to a defect sector location, when controlling a pulse width, a pulse generating location or the number of pulses of a dummy read gate, according to the present invention.

FIG. 4 is a flowchart of a method of reproducing data using a dummy read gate controlling the number of pulses by removing a pulse of a dummy read gate corresponding to a location of a defect sector, when controlling a pulse width, a pulse generating location or the number of pulses of a dummy read gate, according to the present invention.

In operation S410, seeking of a target sector is completed according to a reproduction instruction from a host computer such so that the head 120 is located on a track, in which the target sector exists. In operation S420, a pulse width, a pulse generating location, and the number of pulses of a dummy read gate are set, and the respective set values are stored in the memories 142-1 and 142-3.

In operation S430, it is determined whether a defect sector exists according to information of a defect map stored in the buffer 142-3. If the defect sector exists, the pulse of the dummy read gate corresponding to a location of the defect sector is removed in operation S440, and an adjusted dummy read gate is generated in operation S450. If the defect sector does not exist, a dummy read gate having the number of pulses set in operation S420 is generated, in operation S450.

Figure 5:
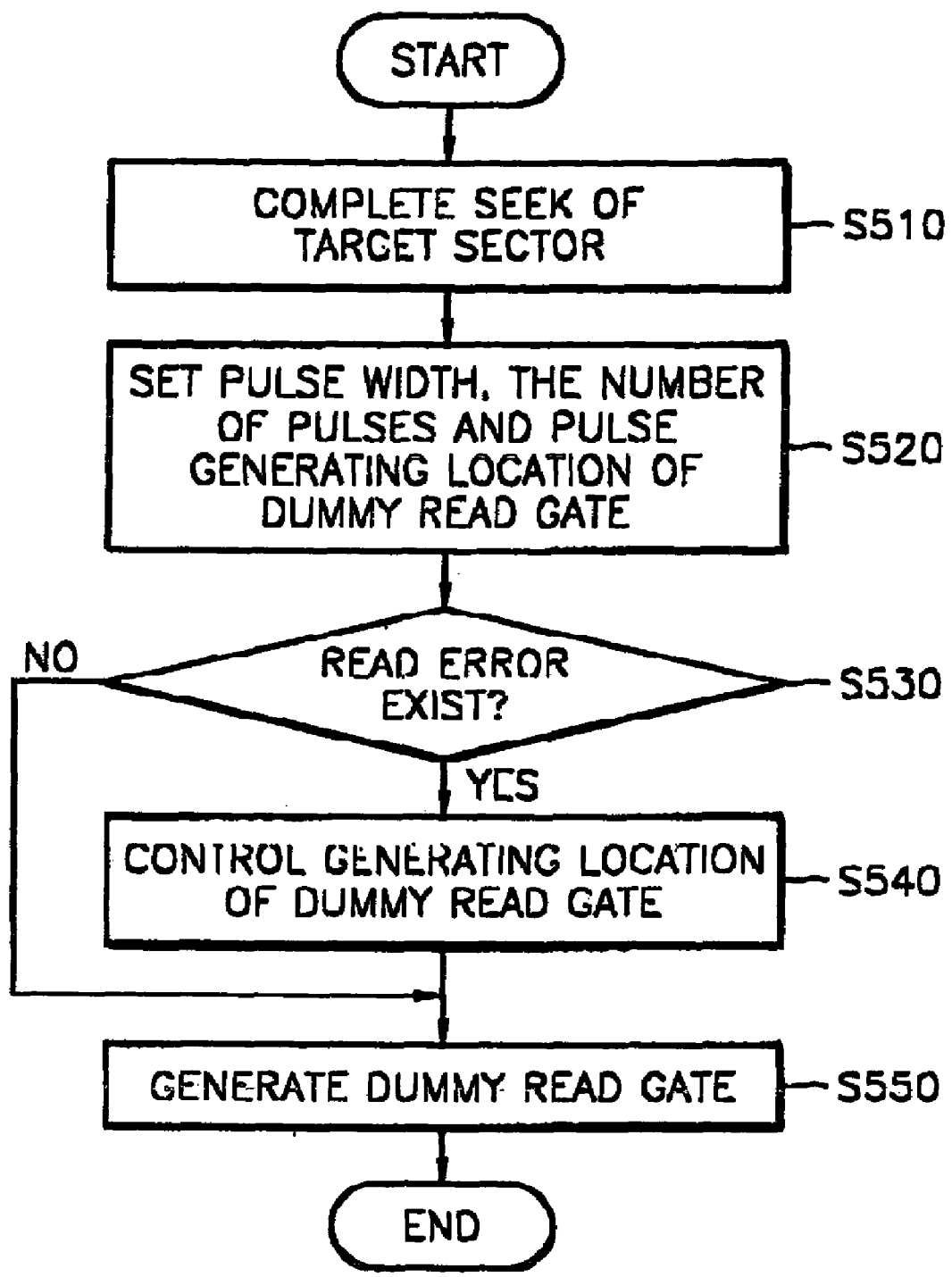
FIG. 5 is a flowchart of a method of reproducing data using a dummy read gate for adjusting a pulse generating location of a dummy read gate when generating a read error, when controlling a pulse width, a pulse generating location or the number of pulses of a dummy read gate, according to the present invention.

FIG. 5 is a flowchart of a method of reproducing data using a dummy read gate by adjusting a pulse generating location of a dummy read gate when generating a read error, by controlling a pulse width, a pulse generating location or the number of pulses of a dummy read gate, according to the present invention.

In operation S510, seeking of a target sector is completed according to a reproduction instruction from a host computer so that the head 120 is located on a track, in which the target sector exists. In operation S520, a pulse width, a pulse generating location and the number of pulses of a dummy read gate are set, and the respective set values are stored in the memories 142-1 and 142-3.

In operation S530, it is determined by the controller 141 whether a read error exists in data reproduction by the head 120 according to the dummy read gate and a read gate, set in operation S520. If the read error exists, a pulse generating location of the dummy read gate is adjusted in operation S540, and an adjusted dummy read gate is generated in operation S550. If the read error does not exist, a dummy read gate according to the generating location set in operation S530 is generated in operation S550. The dummy read gate function is efficiently performed, as long as the dummy read gate is generated in any sector prior to the target sector. Therefore, the dummy read gate can be generated in any location of a sector in which data exists.

The above-described controllable dummy read gate can separately and simultaneously control the pulse width, the pulse generating location and the number of pulses.

Figure 6:
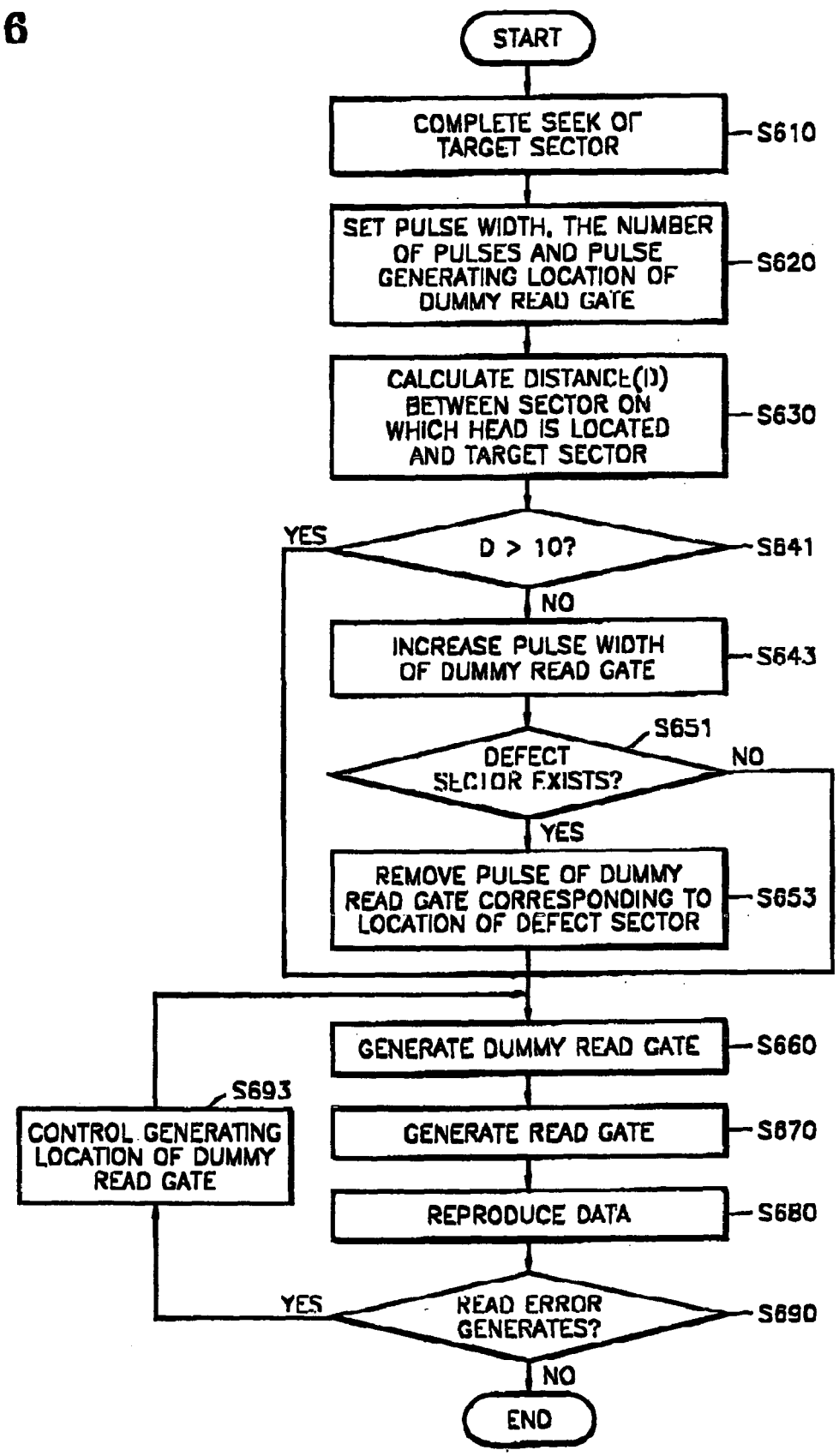
FIG. 6 is a flowchart of a method of reproducing data using a dummy read gate for controlling a pulse width, a pulse generating location and the number of pulses of a dummy read gate according to the present invention.

FIG. 6 is a flowchart of a method of reproducing data using a dummy read gate for controlling a pulse width, a pulse generating location and the number of pulses of a dummy read gate, according to the present invention.

In operation S610, a target sector is sought according to a reproduction instruction from a host computer so that the head 120 is located on a track, in which the target sector exists. In operation S620, a pulse width, a pulse generating location and a number of pulses of a dummy read gate are set, and the respective set values are stored in the memories 142-1 and 142-3.

In operation S630, after seeking of the target sector is completed, a distance D between a sector on the disk 112, on which the head 120 is located, and a target sector is calculated by the controller 141. In operation S641, it is determined whether the distance D exceeds a value of 10. If the distance D is 10 or less, the pulse width is increased by a predetermined set value a by a control instruction of the controller 141 as shown in operation S643. In operation S651, it is determined whether a defect sector exists according to information of a defect map stored in the buffer 142-3. If the defect sector exists in, the pulse of the dummy read gate corresponding to a location of the defect sector is removed in operation S653, and then an adjusted dummy read gate is generated in operation S660. A read gate is generated by the controller 141 in operation S670, and data is reproduced by reproduction instruction of the head 120 in operation S680. As described above, the read gate is generated and the data is reproduced by detecting a sector pulse of the target sector. Therefore, prior to reproducing data, the dummy read gate is generated before generating the read gate by comparing parameters of the R/W channel circuit 145 to target values.

In operation S690, it is determined by the controller 141, which receives a reproduction signal amplified from the preamp 146, whether a read error exists. If the read error exists, a generating location of the pulse of the dummy read gate is adjusted in operation S693, and an adjusted dummy read gate is generated in operation S660. Thereafter steps S670 and S680 are repeated. Here, operation S670 and S680 are repeated 5 times, which is experimentally obtained by using the set values of the dummy read gate set in the above operation S620.

If a read error does not exist in operation S690, a fixed dummy read gate, in which the pulse generating location of the dummy read gate is not controlled, can be generated without performing the above operations S690 and 693 of FIG. 6, and data can be reproduced. Further, a dummy read gate controlling both the pulse width and pulse generating location can be generated, or a dummy read gate, where the pulse of the dummy read gate corresponding to the location of the defect sector is removed, can be generated.

FIGS. 7A–7D are diagrams of various types of dummy read gates for adjusting a pulse width and a pulse generating location of a dummy read gate according to the present invention.

In FIG. 7A a sector pulse and a target sector are illustrated. In FIG. 7B, a dummy read gate of type 1 indicates a dummy read gate signal wherein a pulse width, a pulse generating location and the generating number of pulses are set. A dummy read gate of type 2 shown in FIG. 7C illustrates a dummy read gate signal, having a pulse width increased by a predetermined set value a, relative to the pulse width of the dummy read gate of type 1 when the distance D between the sectors is 10 or less. In the dummy read gate of type 2, since the data sampling time written on the disk 112 increases, the number of pulses of the dummy read gate of type 2 is smaller than that of the dummy read gate of type 1. A dummy read gate of type 3 shown in FIG. 7D illustrates a dummy read gate having a pulse, shifted by a predetermined set value β compared with that of the dummy read gate of type 1, when a read error is generated when reproducing data.

FIG. 8A, is a diagram showing a sector pulse having a defect sector and a target sector. FIG. 8B shows adjusting of the number of pulses of a dummy read gate by removing a pulse corresponding to a defect sector, where the defect sector exists, according to the present invention.

A dummy read gate of type 4 illustrates a dummy read gate, wherein a pulse of a dummy read gate corresponding to a location of a defect sector is removed, when the defect sector exists according to information from a defect map stored in the buffer 142-3.

The present invention also can be embodied as a computer readable code on a recording medium capable of being read by a computer. A computer readable recording medium includes all kinds of recording devices, in which data capable of being reproduced by a computer system is stored. Tangible computer readable recording media include ROMs, RAMs, CD-ROMs, magnetic tapes, hard discs, floppy discs, flash memory, and optical data storage devices. Computer readable recording media may also include a recording device embodied as a carrier wave form, for example, transmission over the Internet. Further, the computer readable recording medium may be distributed to a computer system connected to a network so that the computer readable recording medium may be stored and carried out as a computer readable code.

As described above, according to the present invention, a sufficient input can be supplied to a channel IC by adjusting the pulse width of the dummy read gate and increasing the sampling time. Since the number of pulses of the dummy read gate can be adjusted when a defect sector exists, a location of the defect sector can be avoided by removing a pulse corresponding to the location of the defect sector. Thus, error estimation of parameters of the channel IC can be decreased. Further, where it is determined that the defect sector or signal distortion exists, the read error can be prevented by adjusting the pulse generating location of the dummy read gate, that is, by adjusting a generating location of the defect sector or signal distortion and sampling data at another location.

While the present invention has been particularly shown and described with reference to aspects thereof, it will be understood by those of ordinary skill in the art that various changes in form and details may be made therein without departing from the spirit and scope of the present invention as defined by the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing data comprising:
   generating a dummy read gate by controlling at least one of a pulse width, a pulse generating location and a number of pulses, the dummy read signal being generated in a data sector prior to a target sector, before a read head reaches the target sector, so as to tune a channel of the read head;
   generating a read gate for reproducing the target sector; and
   reproducing the data using the read gate and the dummy read gate,
   wherein the generating of the dummy read gate comprises:
      calculating a distance between a sector on which a head is located and the target sector; and
      generating the dummy read gate, having an increased pulse width, if the calculated distance between the sector on which the head is located and the target sector is smaller than a predetermined value.

2. The method of claim 1, wherein the generated dummy read gate has a pulse removed corresponding to a location of a defect sector if the defect sector exists.

3. The method of claim 1, wherein the dummy read gate is generated by adjusting a generating location of the dummy read gate, if a read error is generated in reproducing the data.

4. A computer readable recording medium for recording a program for carrying out a method according to claim 1 on a computer.

5. A method for reproducing data using a controllable dummy read gate comprising:
   calculating a distance between a sector on a disk on which a read head is located and a target sector;
   removing a pulse of the dummy read gate corresponding to a location of a defect sector of the disk;
   generating a dummy read gate, in which the pulse width is increased if the distance between the sector and the target sector is smaller than a predetermined value and the pulse corresponding to the defect sector is removed, the dummy read signal being generated in a data sector prior to the target sector, before the read head reaches the target sector, so as to tune a channel of the read head;
   generating a read gate for reproducing the target sector; and
   reproducing the data using the read gate and the generated dummy read gate.

6. The method of claim 5, wherein the generated dummy read gate is generated by adjusting a pulse generating location of the dummy read gate, if a read error is generated in the reproducing of the data.

7. A computer readable recording medium for recording a program for carrying out a method according to claim 5 on a computer.

8. A hard disk drive controlling device using a controllable dummy read gate comprising:
   a controller which generates a dummy read gate by adjusting at least one of a pulse width, a pulse generating location and a number of pulses, and generates a read gate for reproducing a target sector;
   a read head which reproduces data from a disk or records data on the disk using the read gate and the dummy read gate; and
   a preamp which amplifies a signal of data reproduced from the head,
   wherein the dummy read signal is generated in a data sector prior to a target sector, before the read head reaches the target sector, so as to tune a channel of the read head, and
   wherein the controller calculates a distance between a sector on which the head is located and a target sector, and generates the dummy read gate wherein the pulse width of the dummy read gate is increased, if the distance between the sector on which the head is located and the target sector is smaller than a predetermined value.

9. The hard disk drive controlling device of claim 8, wherein the controller generates the dummy read gate wherein the pulse of the dummy read gate corresponding to a defect sector is removed, if the defect sector exists.

10. The hard disk drive controlling device of claim 8, wherein the controller generates a dummy read gate by adjusting a generating location of the dummy read gate, if a read error is generated in the reproducing of the data.

11. A method of reproducing data from a memory device using a controllable dummy read gate, comprising:
   calculating a distance between a sector at which a read head is located and a target sector; and
   generating a dummy read gate according to the calculated distance, the dummy read signal being generated in a data sector prior to the target sector, before a read head reaches the target sector, so as to tune a channel of the read head,
   wherein the generating a dummy read pate comprises generating the dummy read pate, having an increased pulse width, when the calculated distance is less than a predetermined value.

12. A tangible computer readable recording medium for recording a program for carrying out the method according to claim 11 on a computer.

13. A method of reproducing data from a memory device using a controllable dummy read gate, comprising:
   seeking a target sector on the memory device;
   setting a pulse width, a number of pulses and a pulse generating location of the dummy read gate;
   calculating a distance between a read head location and a target location on the memory device;
   generating a dummy read gate according to the calculated distance between the head location and the target location, the dummy read signal being generated in a data sector prior to the target sector, before a read head reaches the target sector, so as to tune a channel of the read head; and
   increasing the pulse width of the dummy read gate and generating an adjusted dummy read gate when the calculated distance between the head location and the target location is less than a predetermined value.

14. The method of claim 13, wherein the generating is performed when the calculated distance between the head location and the target location is greater than a predetermined value.

15. The method according to claim 14, wherein the predetermined value is 10.

16. A tangible computer readable recording medium for recording a program for carrying out the method according to claim 13 on a computer.

17. A data reproducer comprising:
   a dummy read gate generating means for generating a dummy read gate by controlling at least one of a pulse width, a pulse generating location and a number of pulses, the dummy read signal being generated in a data sector prior to a target sector, before a read head reaches the target sector, so as to tune a channel of the read head;
   a read gate generating means for generating a read gate for reproducing the target sector; and
   a data reproducing section reproducing the data using the read gate and the dummy read gate,
   wherein the dummy read gate generating means generates the dummy read gate by:
   calculating a distance between a sector at which a head is located and the target sector; and
   generating the dummy read gate, having an increased pulse width, if the calculated distance is less than a predetermined value.

* * * * *

UNITED STATES PATENT AND TRADEMARK OFFICE
CERTIFICATE OF CORRECTION

PATENT NO. : 7,203,016 B2 Page 1 of 1
APPLICATION NO. : 10/651044
DATED : April 10, 2007
INVENTOR(S) : Jae-sung Lee It is certified that error appears in the above-identified patent and that said Letters Patent is hereby corrected as shown below:

Column 9, Line 43, Change "pate" to --gate--.

Column 9, Line 44, Change "pate," to --gate,--.

Signed and Sealed this

Thirty-first Day of July, 2007

JON W. DUDAS
*Director of the United States Patent and Trademark Office*